Aug. 22, 1961   G. R. SUTHERLAND   2,997,320
SHAFT COUPLING
Filed March 23, 1959

*INVENTOR.*
G. R. SUTHERLAND

United States Patent Office 2,997,320
Patented Aug. 22, 1961

2,997,320
SHAFT COUPLING
Gail R. Sutherland, Ottumwa, Iowa, assignor to Deere & Company, Moline, Ill., a corporation of Delaware
Filed Mar. 23, 1959, Ser. No. 801,351
1 Claim. (Cl. 287—118)

This invention relates to a shaft and coupling therefor and more particularly to an improved shaft and socketed member relationship whereby a removable socketed member is adequately retained on the shaft yet is removable when the occasion demands.

The invention finds particular utility in the agricultural implement field as applied to power take-off shafts and similar power shafting, wherein it frequently becomes necessary to separate the shaft from its associated universal joint or equivalent coupling or socketed member. Various types of coupling arrangements are known in the art, and most of them feature a splined connection between the terminal end of the shaft and the associated universal joint, with some means for retaining the joint on the shaft so that axial separation cannot inadvertently occur. Problems involve in arrangements of this character arise because the releasable means often becomes jammed, corroded, rusted and so forth; the cooperative parts are complicated and expensive; and the clamping action may be inadequate, thus allowing angular and axial motion which ultimately destroys the splines or key means.

According to the present invention, these disadvantages are eliminated by the provision of a cooperative relationship between the terminal end of a shaft and a socketed member such as a universal joint yoke, the shaft being externally splined and the yoke being internally splined to mate with and receive the shaft. The yoke is radially split and has a transverse bore which intersects an annular groove in the splined portion of the shaft. A securing member passes through the bore and in one position thereof has a portion received in the groove so as to secure the yoke and shaft against axial separation. It is a feature of the invention that the member passing through the split yoke is selectively tightenable and releasable by cam means at one end thereof. A subsidiary feature is the use on the locking member of a threaded fastener, such as a nut, whereby manufacturing tolerances may be accommodated by adjusting the nut so as to therefore adjust the effectiveness of the locking cam. Another object of the invention is to provide means for releasably retaining the cam in locked position. It is a still further object of the invention to provide the locking member in the form of a bolt or similar threaded member having a notch therein which, when the bolt is turned about its own axis, registers with a portion of the shaft groove so that the yoke may be axially separated from the shaft. In its overall aspects, the invention aims to provide an improved and more economical connection of the character referred to.

The foregoing and other important objects and desirable features inherent in and encompassed by the invention will become apparent as a preferred embodiment thereof is disclosed, by way of example, in the ensuing description and accompanying sheet of drawings, the figures of which are described immediately below.

The numeral 10 designates a representative shaft having its external end provided with axial splines 12 which thus constitute key means on the shaft. The shaft is further formed with an annular groove 14 which intersects the splines 12 and which constitutes a recess or its equivalent in the shaft disposed transversely to the axis of the shaft and at the outer surface of the shaft.

Figure 3:
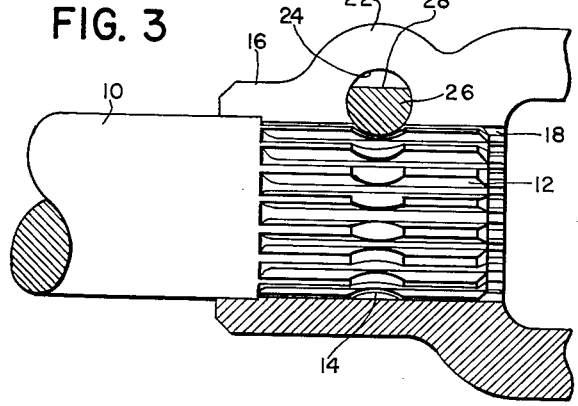
FIG. 3 is a section as seen substantially along the line 3—3 of FIG. 2.
Figure 4:
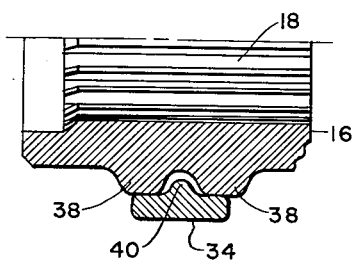
FIG. 4 is a section as seen along the line 4—4 of FIG. 2, with the shaft omitted.

A universal joint yoke 16 is representative of a socketed member having internal axial splines 18 corresponding to or mating with the splines 12 on the shaft, whereby a slip fit is available between the shaft and the yoke 16. The yoke is radially split at 20 to afford a pair of ears 22, and these ears are apertured in alinement at 24 on an axis transverse to the axis of the yoke 16 and lying outside the outer diameter of the shaft 10. When the yoke is properly installed on the shaft, the bores register with or intersect a portion of the shaft groove or recess 14, so that a lock element 26 passed through the ears, will likewise, at times, have a portion thereof received in the groove 14 (FIG. 3).

The element or bolt 26 has, in angularly spaced relation to the portion that is normally received in the shaft recess 14, a notch 28 shaped so that when the element 26 is turned about its own axis, here through a range of 180°, the notch 28 registers with the groove 14, thus removing the bolt as an obstacle to axial separation of the shaft and yoke. Hence, the yoke may be axially moved off the terminal end of the shaft.

Figure 1:
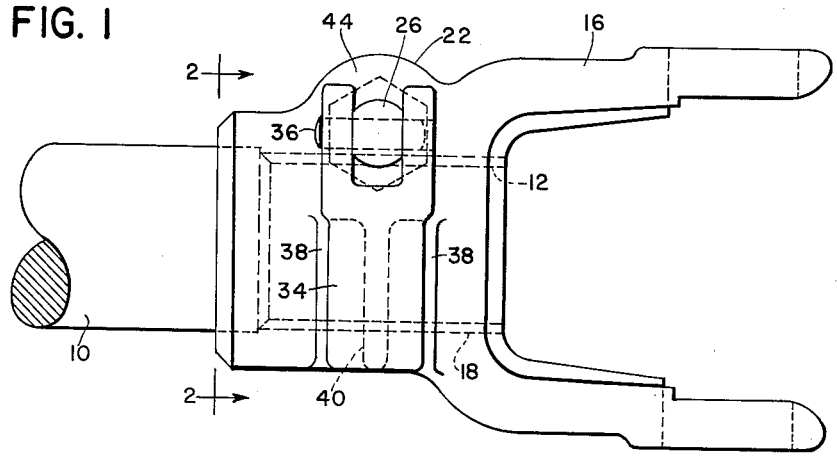
FIG. 1 is an elevation of one end of the shaft and its associated socketed member.
Figure 2:
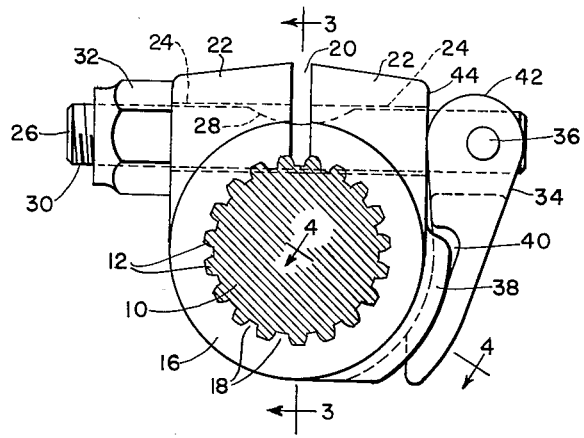
FIG. 2 is a section as seen substantially along the line 2—2 of FIG. 1.

The split nature of the yoke, as afforded at 20, enables the employment of the element or bolt 26 as a clamping device which, together with the ears 22 and parts to be described, constitutes clamping means. As best seen in FIG. 2, one end of the bolt 26 is threaded, at 30, so as to receive an internally threaded fastener such as a nut 32. The opposite end of the bolt projects beyond the other ear 22 and has head means comprising an arm 34 pivoted to the projecting end of the bolt at 36 so that the arm is mounted for swinging toward and away from the proximate side of the yoke. When the arm is in the position shown in the drawings, it is releasably retained against rotation with the bolt 26 about the axis of the bolt by lug means comprising a pair of lugs 38 on the yoke which receive a central rib 40 formed on the arm. The portion of the arm 34 in the vicinity of the pivot 36 is formed as a cam 42 eccentric to the axis of the pivot 36 and cooperative with the proximate surface 44 of the associated ear 22 to afford cam means cooperative to apply and release tension on the bolt 26. In other words, when the arm 34 is in its retained position as illustrated, the cam means 42—44 is effective to draw the ears 22 together in clamping relationship about the terminal end portion of the shaft 10. At the same time, the bolt 26 occupies such angular position that a portion thereof lies in the associated portion of the shaft groove or recess 14. Hence, not only is the yoke tightened on the shaft 10, but the bolt 26 is in such position as to prevent axial separation between the shaft and the yoke. The tightening function plus the locking function of the bolt in the position described eliminates all lost motion between the shaft and the yoke so that the splines 12—18 are effective to transmit torque and the combination clamping and locking actions are sufficient to retain the shaft and yoke 16 against axial displacement, whereby thrust forces transmitted to the two may be readily accommodated.

The clamping function may be adjusted by means of the nut 32 and once adjusted the cam means may be depended upon as the sole means for tightening and relaxing the clamping action; although, further adjustment of the nut 32 may be required as the parts wear. Therefore, in normal conditions, release of the clamping action may be accomplished merely by lifting the arm 34 out of its retention with the lugs 38, as by an appropriate tool, and this will relax the tensional forces applied to the bolt 26 so that the inherent resiliency in the yoke will release the yoke sufficiently to condition it for removal. After the arm 34 has been swung out, it may be used as a lever to rotate the bolt 26 through 180° to bring the notch 28 in register with the groove 14. Thence, the yoke may be axially slipped off the end of the shaft. Replacement of the yoke on the shaft, or on a comparable shaft, requires only the reversal of the foregoing procedure. That is to say, the yoke is slipped onto the end of the shaft with the arm 34 in the position it occupied when the yoke was removed. This means that the notch 28 in the bolt 26 will enable axial accommodation of the shaft by the yoke until the cross bore 24—24 is in register with the shaft groove or recess 14. Following this, the arm 34 may be used to rotate the bolt through 180° to remove the notch 28 from register with the shaft groove 24, and the arm 34 is then swung about its own axis to the position shown in FIG. 2, the cam means 42—44 being effective to tighten the clamping action and the rib 40 on the arm 34 being received between the lugs 38 so as to retain the arm against turning with the bolt 26 about its own axis. The cam means 42—44 is preferably designed so as to have an over-center relationship with the arm 34 in the position of FIG. 2, so that an appreciable force is necessary to swing the arm 34 outwardly to disengage the rib 40 from the lugs 38.

Features and advantages, other than those outlined above, will readily occur to those versed in the art, as will many modifications and alterations in the preferred embodiment disclosed, all of which may be readily achieved without departure from the spirit and scope of the invention.

What is claimed is:

In combination: a shaft having a terminal end provided with axial external key means and further having a transverse recess in its surface; a socketed member coaxially fitting the shaft and keyed thereto by the key means and radially split to afford a pair of ears respectively having apertures alined on an axis transverse to and radially outwardly of the shaft; lock means releasably securing the shaft and member against axial separation, including a lock element passed loosely through the ear apertures and projecting at opposite ends respectively beyond the ears, said element having a portion thereof received in the recess to establish a locking position of said element and being turnable in the ears to an unlocking position in which said portion is rotated out of said recess, said element having a notch registering with the recess in said unlocking position and shaped and dimensioned to accommodate the outside surface of the shaft in the area of the recess so as to enable axial separation of the shaft and member; an arm pivoted to one end of the element on an axis transverse to the length of the element for swinging between a first position in which one side thereof lies adjacent to one side of the socket member when the element is in its locking position and a second position in which said arm is swung outwardly away from the member to serve as a handle for turning the element to its unlocking position; an abutment on one end of the element engaging the proximate ear; cam means cooperative between the handle and the other ear and effective in a clamping condition when the arm is in its first position to tension the element so as to increase the clamping action of the member on the shaft and effective in a releasing condition when the arm is swung to its second position; and retainer means cooperative between the arm and the socket member, including a first part on said one side of the socket member facing outwardly and a second part on said one side of the arm facing inwardly, said parts being registrable in a direction transverse to the axis of the shaft when the element is in its locking position and being thence interengageable when the arm is swung toward said one side of the socket member and said parts being disengageable by swinging of the arm away from the socket member, said parts interfitting when interengaged so as to hold the arm against turning with the element in either direction about the axis of the element.

References Cited in the file of this patent

UNITED STATES PATENTS

| | | |
|---|---|---|
| 549,774 | Forst | Nov. 12, 1895 |
| 570,309 | Johnson | Oct. 27, 1896 |
| 1,379,162 | Brown | May 24, 1921 |
| 2,278,698 | Green | Apr. 7, 1942 |
| 2,749,787 | Ollagnon | June 12, 1956 |
| 2,815,229 | Cook | Dec. 3, 1957 |
| 2,885,231 | Smith | May 5, 1959 |

FOREIGN PATENTS

| | | |
|---|---|---|
| 21,838 | Great Britain | Oct. 2, 1896 |